(No Model.) 3 Sheets—Sheet 2.

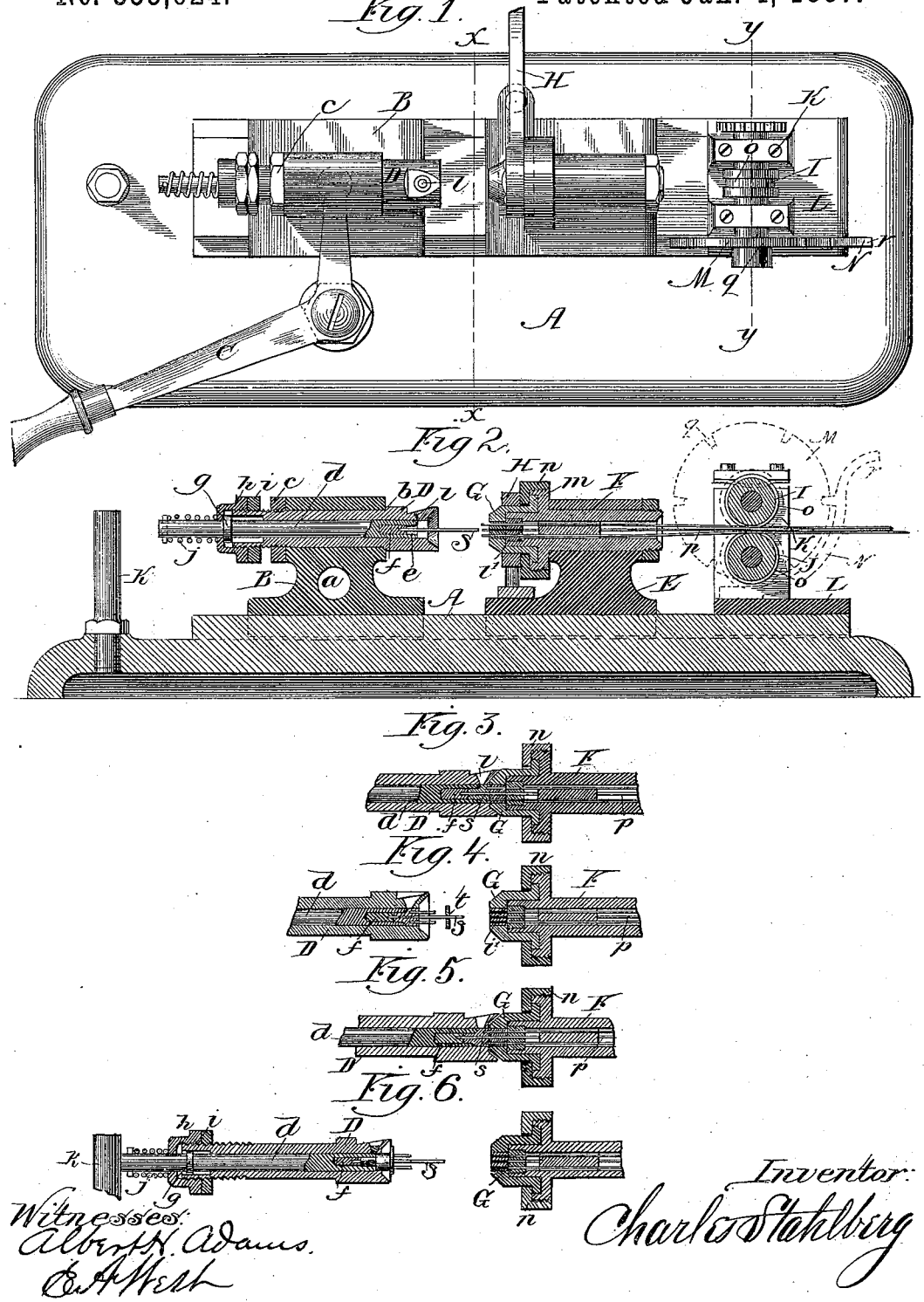

C. STAHLBERG.
MANUFACTURE OF SHAFTS AND PINIONS FOR CLOCK WORKS.

No. 355,624. Patented Jan. 4, 1887.

Witnesses:
Albert H. Adams
E. A. West

Inventor:
Charles Stahlberg (No Model.) 3 Sheets—Sheet 3.

C. STAHLBERG.
MANUFACTURE OF SHAFTS AND PINIONS FOR CLOCK WORKS.

No. 355,624. Patented Jan. 4, 1887.

Witnesses:
Albert H. Adams
E. A. West

Inventor:
Chas. Stahlberg

UNITED STATES PATENT OFFICE.

CHARLES STAHLBERG, OF LA SALLE, ILLINOIS.

MANUFACTURE OF SHAFTS AND PINIONS FOR CLOCK-WORKS.

SPECIFICATION forming part of Letters Patent No. 355,624, dated January 4, 1887.

Application filed August 7, 1886. Serial No. 210,252. (No model.)

*To all whom it may concern:*

Be it known that I, CHARLES STAHLBERG, residing at La Salle, in the county of La Salle and State of Illinois, and a citizen of the United States, have invented a new and useful Improvement in the Manufacture of Clock-Works, of which the following is a full description, reference being had to the accompanying drawings, in which—

Figure 7:
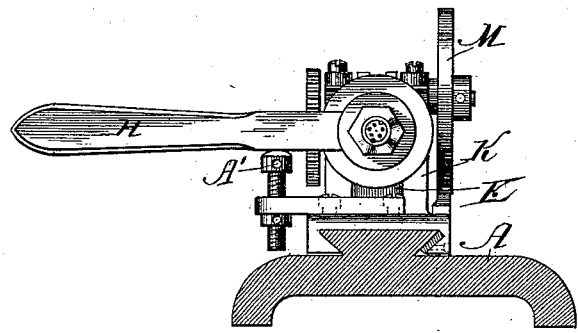
Figure 8:
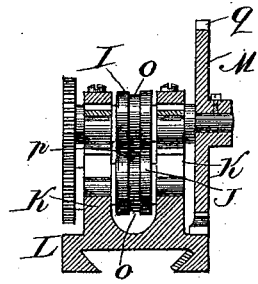
Figure 9:
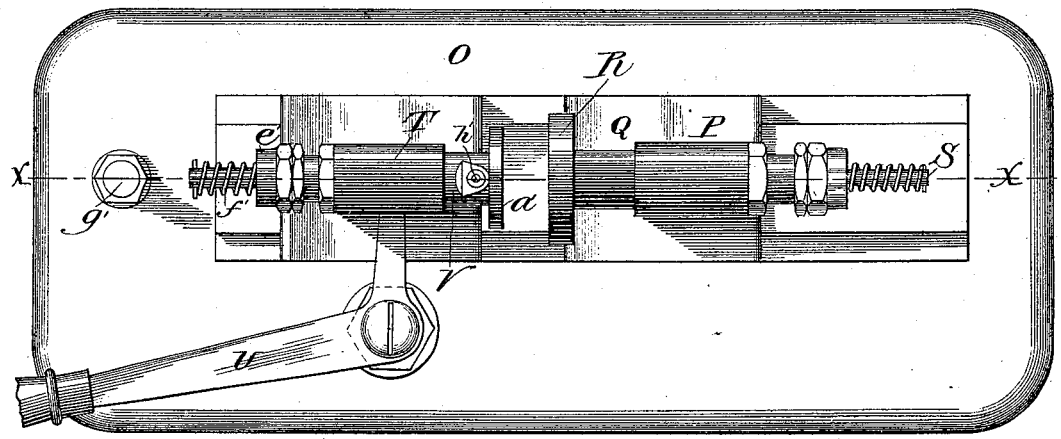
Figure 10:
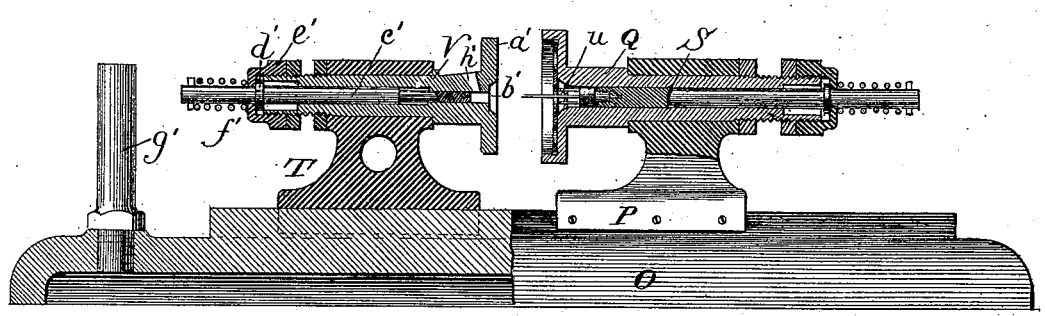
Figure 11:
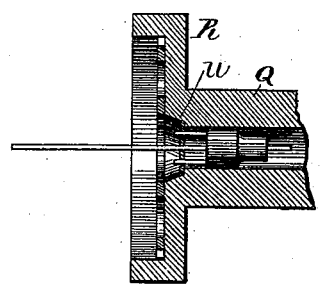
Figure 12:
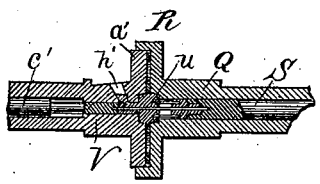
Figure 13:
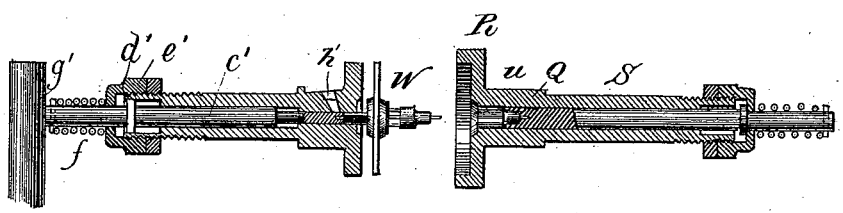
Figure 14:

Figure 1 is a plan of the mold, devices for feeding the wires thereto and cutting off the same, with some other parts. Fig. 2 is a vertical longitudinal section of the same parts. Fig. 3 is a detail, being a section through the two parts of the mold, and showing metal which has been poured in. Fig. 4 is a detail, being a longitudinal section showing the two parts of the mold separated, with a shaft or arbor in one part, and a washer. Fig. 5 is a view similar to that shown in Fig. 4, the two parts of the mold being brought together. Fig. 6 is a longitudinal section, the two parts of the mold being separated and the plunger being advanced. Fig. 7 is a cross-section at line $x$ of Fig. 1. Fig. 8 is a cross-section at line $y$ of Fig. 1. Fig. 9 is a plan representing the two parts of another mold, designed to be used in making wheels having an open pinion. Fig. 10 is a central vertical section at line $x\,x$ of Fig. 9. Fig. 11 is an enlarged detail. Fig. 12 is a detail showing the two parts of the mold shown in Fig. 10, with the wheel having an open pinion therein. Fig. 13 is the same as Fig. 12, except that the two parts of the mold are separated and the wheel is being removed. Fig. 14 is a detail showing a completed shaft provided with pinion-leaves, but having no wheel.

The objects of this invention are to provide improved devices for manufacturing shafts or arbors and wheels and some other parts of clock-work and similar mechanisms, and to provide an improved method of making such parts, which I accomplish by means of molds in which the pivots and pinion-leaves for the arbors can be placed, and by casting around the parts placed in the molds metal which expands on cooling. I also provide devices for feeding the pinion wires or strips to the molds, and for cutting off the same, and some other devices useful in the operation, as illustrated in the drawings, and as hereinafter described. Those things which I claim as new will be set forth in the claims.

Prior to the making of my invention shafts or arbors of clock-wheels were made commencing with large pieces and working them down to the proper size and form by turning, milling, &c. I commence with small pieces and build onto them by casting, which is a great saving of labor.

In the drawings I have illustrated, Figs. 1 to 14, inclusive, the devices which I use in making a clock-wheel having a lantern or open pinion, using two molds, one for making the shaft or arbor with its pinion-leaves, and the other for securing the wheel upon the shaft.

In the drawings, A represents a bed-plate.

B is a standard which slides upon the bed-plate A, being provided with a hole or socket, $a$, to receive one arm of the lever C, by means of which it is moved.

D is a piece of metal in a socket in the upper end of B, and is held in place by means of a shoulder, $b$, and nut $c$. It is provided with a central passage extending through it, the inner end of which is enlarged, as shown in the drawings.

$d$ is a metal rod or plunger in the central opening in D. The inner end of this rod $d$ is chambered out, as clearly shown at $e$, Fig. 2.

$f$ is a piece of metal at the outer end of the chamber in $d$. $f$ is provided at its inner end with a hole to receive the end of a piece of wire.

$g$ is a fixed collar on $d$.

$h$ is a nut arranged to engage with the collar $g$.

$i$ is a set-nut.

$j$ is a spring.

$k$ is a post on the bed-plate.

The piece D is provided with a hole, $l$, (see Figs. 1 to 6,) into which melted metal may be poured.

E is a standard firmly secured to the bed-plate A. It has a socket at its upper end, in which is located a piece of metal, F, held in place by a shoulder and nut.

G is a piece of metal beveled at its inner end to correspond with the opening in the inner end of the piece D. Its other end is provided with a flange, $m$. G is placed upon one end of F and rotates thereon, being held in place sufficiently tight by means of a nut, $n$, which engages with the flange m. The face of the inner end of G forms one wall of the mold. Through F and G are a number of small holes, which can be made to register with each other, adapted to receive small wires.

H is a lever upon the metal piece G, by means of which it can be partially rotated.

I J are two rollers which are supported in bearings in standards K, which, as shown, are cast with a block, L, which block is secured to the bed-plate. Each of the rollers I J is provided with a central groove, o.

p are a number of small wires between the two rollers I J.

M is a wheel upon the shaft of the roller I, by which it can be rotated, its rotation driving the other roller through gear-wheels.

q are notches in the periphery of the wheel M.

N is a spring secured at one end to the block L, which spring is provided with a projection to engage with the notches q, and with a thumb-piece, r, for disengaging the projection from the notches.

s is a piece of wire, the ends of which form the pivots of a completed arbor or wheel.

t is a thin washer placed upon s. It may be made of card-board.

O is another bed-plate.

P is a standard secured to the bed-plate O, having a socket at its upper end, in which is located a piece of metal, Q, held in the socket by a shoulder and nut.

R is a cup-shaped piece upon the inner end of Q. Through Q there is a longitudinal passage, the inner end of which is slightly enlarged, forming a cavity, u.

S is a metal rod located in the piece Q. The inner end of S is chambered to receive the pivot and a portion of the shaft or arbor, as shown in Fig. 10. S can be adjusted by a nut and spring, as shown in Fig. 10.

T is another standard arranged to slide upon the bed O, the same as does B, being moved by a lever, U. The upper end of this standard T is provided with a notch, in which is placed a piece of metal, V, carrying on its inner end a plug, a', which fits into the cup-shaped piece R. The face of a' is provided with a cavity, b'. V has a hole through it longitudinally to receive the plunger c', the inner end of which is smaller than the remainder. This piece c' is provided with a collar, d', and is held in place by a nut, e'.

f' is a spring on c'.

g' is a post on the bed O.

h' is a hole into which metal may be poured.

W, Fig. 13, represents a completed wheel having an open pinion.

The operation is as follows: To make a shaft or arbor with pinion-leaves, I provide a piece of wire, s, of proper length, and insert one end into the hole in the piece f, as shown in Fig. 2. The wires p are also to be advanced to the position shown in Fig. 2, the ends of the wires projecting beyond the face of G. The wires can be advanced by rotating the wheel M by hand. The projection on the spring N arrests the movement of M at the proper time by entering one of the notches therein. Then B and D are to be advanced, by means of the lever C, to the position shown in Fig. 3, in which the projecting ends of these wires will be in the cavity near the inner end of D, and the end of G will enter the opening at the end of D. At the same time s will enter a small hole in G. The piece G is then to be turned by means of the lever H, and the wires p will be cut off at line i'. Then molten metal is to be poured into the mold through the hole l, and the metal will pass into the cavity around the pin s and around those parts of the pinion-leaves which project beyond the face of G, filling the cavity. I thus form a shaft or arbor having pinion-leaves, as shown in Fig. 14.

To complete a wheel having an open pinion, I first place a washer, t, of card-board or other thin material, centrally on the wire s, Fig. 4, and then bring D into the position shown in Fig. 5, which pierces holes in the washer and forces it onto the pinion-leaves. (See Fig. 5.) B is then to be drawn back with force enough to bring the outer end of d in contact with the post k, forcing d and the arbor forward, which movement will cut off the sprue, and the arbor will be partly pushed out, as shown in Fig. 6. The wheel which is to be secured to the arbor thus made is then to be placed in the cup-shaped piece R, and the arbor, made as aforesaid, is to be placed in the opening in the inner end of Q, as shown in Fig. 10, and the washer, coming in contact with the shoulder at the bottom or outer end of the cavity u, will be forced to a point near the free ends of the pinion-leaves, as clearly shown in Fig. 11, leaving such ends of the pinion-leaves to project a little beyond the washer. The standard T is then to be advanced, carrying with it V, until the latter is brought into the position shown in Fig. 12, in which the plug a' has entered the cup-shaped piece R and has come in contact with one face of the wheel therein. Metal is then to be poured into the hole h', which will run into the cavity in the end of a', and through the central opening in the wheel into the cavity in the end of R and around the exposed ends of the pinion-wires, as shown in Fig. 12. The washer prevents the flow of the metal beyond it, so that there will be an open pinion, as indicated in Fig. 12. The standard T and the parts connected therewith are then to be drawn back by the lever U with sufficient force to bring the rod or plunger c' into contact with the post g' with some force, causing the plunger c' to advance, and the completed wheel will be partly pushed from a', as shown in Fig. 13, the sprue being at the same time cut off.

I do not limit myself to the feeding and cutting-off devices herein described. Any known devices suitable for these purposes may be used. The pinion-leaves might be cut of proper length and be inserted into the head G from the face, in which case the holes to receive the pinion-leaves should not extend through G, but only so far as required. It is much better, however, to use devices for feeding the wires substantially as described.

It is not necessary that the wire *s* extend through the entire length of the shaft or arbor. It might be made in two short pieces, one to be inserted in D and the other in G.

The alloy used is one which expands upon solidifying, and which melts at a comparatively low temperature. Type-metal, or other alloy possessing these properties, may be used.

The central parts of the inner ends of G and F may be provided with metal harder than the remaining parts to facilitate cutting of the wires. These harder parts are indicated, but not lettered, in the drawings.

The support E and block L can be adjusted on the bed-plate. The plunger can be adjusted as required for arbors of different lengths.

The position of G can be adjusted so that the holes through it will register with the holes in F by adjusting the screw A', on which the lever H rests.

Arbors without pinions can be made by the use of my method; the parts which form the pinion-leaves being omitted from the mold.

Arbors with pinions, but without wheels, can be made in substantially the manner described.

Some advantages from making arbors for clock-works, as herein set forth, are that the pivots and other wearing parts can be made of very hard steel, and the pivots can also be made very small and perfectly cylindrical with very little labor, and the parts, when made, will be interchangeable.

The molten metal is to be poured under pressure, as is usual in casting type.

What I claim as new, and desire to secure by Letters Patent, is—

1. For the purpose of making, for clock-works and kindred mechanisms, arbors with or without pinions, and composed in part of hard parts and in part of a softer metal cast upon or about portions of the hard parts, a mold consisting of two or more movable parts, one or more of said parts being provided with holes to hold the hard parts of the article to be made, said mold being provided with a cutting mechanism, and formed internally to receive the molten metal to be cast about the hard parts of the article manufactured, substantially as described.

2. In the manufacture of arbors for clock-works, a mold consisting of a part, D, and a holding-piece, G, provided with holes to receive and hold the pinion-wires, said mold receiving the molten metal to be cast about the wires to form the arbors, in combination with a mechanism for cutting off the wires, substantially as and for the purpose specified.

3. In a mold for making arbors for clock-works, a holding-piece, G, provided with holes to receive and hold the pinion-wires, in combination with a mechanism for cutting off the wires and a mechanism for feeding the pinion-wires to the holding-piece, substantially as and for the purpose specified.

4. In a mold for casting arbors for clock-works and kindred mechanisms, and having two parts opening transversely, a movable plunger, in combination with stop-nuts for the purpose of adjusting the position of the plunger for arbors of different lengths, and a spring to return the plunger, substantially as specified.

5. The method herein described of making shafts, shafts with pinions, and shafts with pinions and wheels, for clock-works and kindred mechanisms, which consists in making the pivots and pinion-leaves and wheels of hard metal and in separate pieces, then arranging in a suitable mold such of the said hard parts as are required for the article to be made, and casting on or about portions of such parts a melted alloy, leaving the acting parts exposed, using an alloy which expands on solidifying and melts at a lower temperature than the hard parts, substantially as specified.

6. A mold consisting of two parts, one part provided with holes to receive pinion-leaves, the other part provided with a cavity adapted to receive and hold one end of an arbor provided with pinion-leaves, in combination with such an arbor for the purpose of piercing core-washers and forcing the same onto the leaves of the pinion, substantially as specified.

CHARLES STAHLBERG.

Witnesses:
E. A. WEST,
ALBERT H. ADAMS.